US012679917B2

(12) United States Patent
Ichikawa et al.

(10) Patent No.: US 12,679,917 B2
(45) Date of Patent: Jul. 14, 2026

(54) GRAFT-MODIFIED PRODUCT, ADHESIVE, OLEFIN RESIN COMPOSITION, AND LAMINATE

(71) Applicant: MITSUI CHEMICALS, INC., Tokyo (JP)

(72) Inventors: Tatsuya Ichikawa, Ichihara (JP); Katsuyoshi Harada, Chiba (JP); Yusuke Mizobuchi, Ichihara (JP); Yuuya Goto, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 535 days.

(21) Appl. No.: 18/038,683

(22) PCT Filed: Nov. 30, 2021

(86) PCT No.: PCT/JP2021/043839
§ 371 (c)(1),
(2) Date: May 24, 2023

(87) PCT Pub. No.: WO2022/118836
PCT Pub. Date: Jun. 9, 2022

(65) Prior Publication Data

US 2024/0026054 A1 Jan. 25, 2024

(30) Foreign Application Priority Data

Dec. 4, 2020 (JP) ................................ 2020-202205

(51) Int. Cl.

| | |
|---|---|
| ***C08F 255/02*** | (2006.01) |
| ***B32B 27/08*** | (2006.01) |
| ***B32B 27/30*** | (2006.01) |
| ***B32B 27/36*** | (2006.01) |

(52) U.S. Cl.
CPC ............ *C08F 255/02* (2013.01); *B32B 27/08* (2013.01); *B32B 27/308* (2013.01); *B32B 27/36* (2013.01); *B32B 2250/03* (2013.01); *B32B 2250/24* (2013.01); *B32B 2250/40* (2013.01); *B32B 2323/046* (2013.01); *B32B 2327/18* (2013.01)

(58) Field of Classification Search
CPC ....... C08F 255/02; B32B 27/08; B32B 27/36; B32B 27/30
USPC .......................................................... 525/242
See application file for complete search history.

(56) References Cited

U.S. PATENT DOCUMENTS

| | | | | |
|---|---|---|---|---|
| 8,182,925 | B2 * | 5/2012 | Yasui | C09J 179/00 428/515 |
| 10,985,359 | B2 | 4/2021 | Takei et al. | |
| 2009/0110945 | A1 * | 4/2009 | Yasui | C09J 123/02 525/194 |
| 2018/0334593 | A1 * | 11/2018 | Shiga | C08F 8/00 |
| 2019/0245189 | A1 | 8/2019 | Takei et al. | |
| 2021/0203046 | A1 | 7/2021 | Takei et al. | |
| 2022/0081598 | A1 | 3/2022 | Iwashita et al. | |

FOREIGN PATENT DOCUMENTS

| | | | | |
|---|---|---|---|---|
| JP | H06-145260 | A | | 5/1994 |
| JP | 2005048127 | A | * | 2/2005 |
| JP | 2019-135698 | A | | 8/2019 |
| WO | WO-2007/040261 | A1 | | 4/2007 |
| WO | WO-2020/145239 | A1 | | 7/2020 |

* cited by examiner

*Primary Examiner* — Deve V Hall
(74) *Attorney, Agent, or Firm* — Foley & Lardner LLP

(57) ABSTRACT

One embodiment of the present invention relates to a graft-modified product, an adhesive, an olefin resin composition, or a laminate, and the graft-modified product is a graft-modified product of at least one base polymer selected from polyolefins by a carbodiimide monomer having a carbodiimide group and a polymerizable double bond.

12 Claims, No Drawings

GRAFT-MODIFIED PRODUCT, ADHESIVE, OLEFIN RESIN COMPOSITION, AND LAMINATE

CROSS-REFERENCE TO RELATED APPLICATIONS

The present application claims priority under 35 U.S.C. § 371 to International Patent Application No. PCT/JP2021/043839, filed Nov. 30, 2021, which claims priority to and the benefit of Japanese Patent Application No. 2020-202205, filed Dec. 4, 2020. The contents of these applications are hereby incorporated by reference in their entireties.

TECHNICAL FIELD

One embodiment of the present invention relates to a graft-modified product, an adhesive, an olefin resin composition, or a laminate.

BACKGROUND ART

Polyolefins such as polyethylene and polypropylene are excellent in, for example, mechanical strength, rigidity, heat resistance, chemical resistance, oil resistance, transparency, and low-temperature impact resistance, and are widely used as packaging materials and coating materials for, for example, films, sheets, and bottles, or as decorative materials for, for example, wallpaper, taking advantage of these properties.

However, since polyolefins do not contain a polar group in the molecule, polyolefins are poor in compatibility with polar resins such as polyester, polyphenylene sulfide, polyamide, polyacetal, polycarbonate, poly (meth) acrylate, modified fluorine resin, and biomass plastic, and in adhesion to, for example, metal, glass, paper, or the polar resins, and thus their ability to be blended or laminated with these materials has been limited.

In order to solve these problems, a method of grafting a polar group-containing monomer to a polyolefin to improve the compatibility and adhesion has been widely used. For example, a method of grafting, for example, glycidyl (meth) acrylate to polyolefin is generally and widely used (for example, Patent Literature 1).

CITATION LIST

Patent Literature

Patent Literature 1: JP H6-145260A

SUMMARY OF INVENTION

Technical Problem

The modified polyolefin obtained by, for example, the method described in Patent Literature 1 can improve the compatibility and the adhesiveness to some extent, but the compatibility and the adhesiveness are not sufficient, and in particular, the adhesion strength is not sufficient, or it takes a long time to develop sufficient adhesive strength.

One embodiment of the present invention provides a graft-modified product capable of forming a layer having high adhesion strength even in a short time on a base material having a polar group such as polyester or polyphenylene sulfide.

Solution to Problem

As a result of research, the present inventors have found that the above problems can be solved by the following configuration examples. Configuration examples of the present invention are as follows:

[1] A graft-modified product of at least one base polymer selected from polyolefins by a carbodiimide monomer having a carbodiimide group and a polymerizable double bond.

[2] The graft-modified product according to [1], wherein the carbodiimide monomer is a carbodiimide monomer represented by the following formula (1):

[Formula 1]

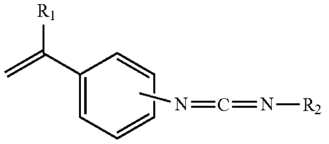

(1)

wherein R 1 is a hydrogen atom or a methyl group, and $R_2$ is a hydrocarbon group optionally having a substituent.

[3] The graft-modified product according to [2], wherein $R_2$ is an alicyclic ring-containing aliphatic hydrocarbon group having 4 to 20 carbon atoms.

[4] The graft-modified product according to [1], wherein the carbodiimide monomer is a carbodiimide monomer represented by the following formula (2):

[Formula 2]

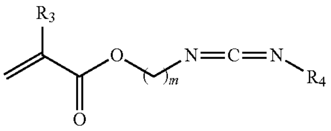

(2)

wherein $R_3$ is a hydrogen atom or a methyl group, $R_4$ is a hydrocarbon group optionally having a substituent, and m is an integer of 2 or more.

[5] The graft-modified product according to [4], wherein $R_3$ is a methyl group, $R_4$ is a branched and ring-free alkyl group, and m is 2.

[6] The graft-modified product according to any one of [1] to [5], wherein the base polymer is a polymer being free of at least one active hydrogen-containing group selected from a carboxy group, an acid anhydride group, an amino group, a hydroxy group, and a thiol group.

[7] The graft-modified product according to any one of [1] to [6], wherein the polyolefin is at least one selected from an ethylene polymer and a propylene polymer.

[8] An olefin resin composition comprising the graft-modified product according to any one of [1] to [7] and one or more olefin polymers.

[9] An adhesive comprising the graft-modified product according to any one of [1] to [7] or the olefin resin composition according to [8].

[10] A laminate comprising:

one layer (A) selected from a layer containing the graft-modified product according to any one of [1] to [7] and a layer containing the olefin resin composition according to [8]; and a base material layer (B).

[11] The laminate according to [10], wherein the base material layer (B) is a layer having a polar group.

[12] The laminate according to [11], wherein the polar group is a carboxy group or a hydroxy group.

Advantageous Effect of Invention

According to one embodiment of the present invention, it is possible to provide a graft-modified product capable of forming a layer having high adhesion strength even in a short time (short sealing time) on a base material having a polar group such as polyester or polyphenylene sulfide.

DESCRIPTION OF EMBODIMENTS

<<Graft-Modified Product>>

A graft-modified product (graft-modified polymer) according to one embodiment of the present invention (hereinafter, also referred to as "present modified product") is a graft-modified product of at least one base polymer selected from polyolefins by a carbodiimide monomer having a carbodiimide group and a polymerizable double bond, in other words, a graft-modified product in which at least one base polymer selected from polyolefins is graft-modified with a carbodiimide monomer having a carbodiimide group and a polymerizable double bond. It can also be said that the present modified product is a graft-modified product containing at least one base polymer moiety selected from polyolefins and a graft moiety derived from a carbodiimide monomer having a carbodiimide group and a polymerizable double bond.

According to the present modified product, a layer having high adhesion strength can be formed even in a short time on a base material having a polar group such as polyester or polyphenylene sulfide.

Since the present modified product has higher reactivity with a polar group present in, for example, polyester or polyphenylene sulfide as compared with a graft-modified product by glycidyl(meth)acrylate, the present modified product is remarkably excellent in adhesion to these base materials.

Further, the present modified product is not a block copolymer or a random copolymer of an olefin monomer such as ethylene or propylene and the carbodiimide monomer, but is a graft-modified product, and thus exhibits the above effects.

The graft ratio in the present modified product is preferably 0.3 to 7% by mass, and more preferably from 0.5 to 5% by mass, from the viewpoints that the present modified product can be easily synthesized, a graft-modified product having more excellent compatibility and adhesiveness can be easily obtained, and the obtained graft-modified product does not become too hard.

The graft ratio is the mass of the structure derived from the carbodiimide monomer in the graft-modified product and can be determined by $^1$H NMR measurement, specifically by the method described in Examples below.

<Carbodiimide Monomer>

The carbodiimide monomer used for graft-modifying the base polymer is not particularly limited as long as it is a compound having a carbodiimide group and a polymerizable double bond, but is preferably a compound represented by the following formula (1) or (2) from the viewpoint of, for example, further exhibiting the effects of the present invention.

Two or more carbodiimide monomers may be used for graft-modification of the base polymer, but usually one carbodiimide monomer is used.

[Formula 3]

(1)

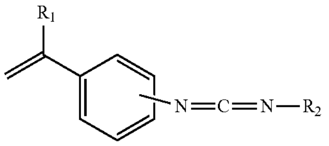

In the formula (1), $R_1$ is a hydrogen atom or a methyl group, and is preferably a hydrogen atom from the viewpoint of, for example, easily obtaining the present modified product having a high graft ratio.

In the formula (1), $R_2$ is a hydrocarbon group optionally having a substituent. Specific examples of the hydrocarbon group include an alkyl group or aryl group optionally having a substituent. The alkyl group optionally having a substituent may be chain-like (may be linear or branched) or may include an alicyclic ring.

The number of carbon atoms of the hydrocarbon group optionally having a substituent is preferably 1 or more, and more preferably 3 or more, and is preferably 20 or less, more preferably 12 or less, and still more preferably 8 or less.

Examples of the substituent which the hydrocarbon group may have include a halogen atom, a hydrocarbon group having 1 to 8 carbon atoms, an alkoxy group having 1 to 8 carbon atoms, a carboxylic acid ester group having 1 to 8 carbon atoms, a sulfonic acid ester group having 1 to 8 carbon atoms, a carbonyl group having 1 to 8 carbon atoms, an amide group having 1 to 8 carbon atoms, an amino group having 1 to 8 carbon atoms, a sulfide group having 1 to 8 carbon atoms, a phosphoric acid ester group having 1 to 8 carbon atoms, an alkylsilyl group having 1 to 8 carbon atoms, and an alkoxysilyl group having 1 to 8 carbon atoms.

Among these, the $R_2$ is preferably an alicyclic ring-containing aliphatic hydrocarbon group having 4 to 20 carbon atoms, and more preferably an alicyclic hydrocarbon group having 5 to 7 carbon atoms, from the viewpoint of, for example, the solubility of the carbodimide monomer, the availability thereof, and the ease of purification of the resulting graft-modified product.

Examples of the alicyclic ring include a cyclobutyl ring, a cyclopentyl ring, a cyclohexyl ring, a cycloheptyl ring, and these rings having a hydrocarbon group. Further, the alicyclic ring may be a polycyclic ring such as an adamantyl ring and a methyladamantyl ring.

[Formula 4]

(2)

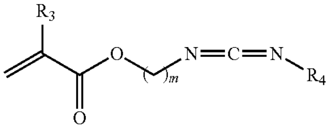

In the formula (2), $R_3$ is a hydrogen atom or a methyl group, and is preferably a methyl group from the viewpoint of, for example, easily obtaining the present modified product having excellent adhesion strength to base materials having a polar group.

In the formula (2), $R_4$ is a hydrocarbon group optionally having a substituent. Specific examples of the hydrocarbon group include an alkyl group or aryl group optionally having a substituent. The alkyl group optionally having a substituent may be chain-like (may be linear or branched) or may include an alicyclic ring.

The number of carbon atoms of the hydrocarbon group optionally having a substituent is preferably 1 or more, and more preferably 3 or more, and is preferably 20 or less, more preferably 12 or less, and still more preferably 8 or less.

Examples of the substituent which the hydrocarbon group may have include a halogen atom, a hydrocarbon group having 1 to 8 carbon atoms, an alkoxy group having 1 to 8 carbon atoms, a carboxylic acid ester group having 1 to 8 carbon atoms, a sulfonic acid ester group having 1 to 8 carbon atoms, a carbonyl group having 1 to 8 carbon atoms, an amide group having 1 to 8 carbon atoms, an amino group having 1 to 8 carbon atoms, a sulfide group having 1 to 8 carbon atoms, a phosphoric acid ester group having 1 to 8 carbon atoms, an alkylsilyl group having 1 to 8 carbon atoms, and an alkoxysilyl group having 1 to 8 carbon atoms.

Among these, the $R_4$ is preferably a branched and ring-free alkyl group, more preferably a branched and ring-free alkyl group having 3 to 7 carbon atoms from the viewpoint of, for example, easily obtaining the present modified product having excellent adhesion strength to base materials having a polar group, particularly polyester.

Suitable examples of the branched and ring-free alkyl group include an isopropyl group, a sec-butyl group, an isobutyl group, a tert-butyl group, a 1-methylbutyl group, a 1,2-dimethylpropyl group, a 2-methylbutyl group, a 3-methylbutyl group, a 1-ethylpropyl group, a 1,1-dimethylpropyl group, a 2,2-dimethylpropyl group, a 1-methylpentyl group, a 1,2-dimethylbutyl group, a 1,3-dimethylbutyl group, a 1,2,2-trimethylpropyl group, a 2 methylpentyl group, a 2,2-dimethylbutyl group, a 2,3-dimethylbutyl group, a 2-ethylbutyl group, a 3-methylpentyl group, a 3,3-dimethylbutyl group, a 4-methylpentyl group, a 1-ethyl-2-methylpropyl group, a 1-ethylbutyl group, a 1,1-dimethylbutyl group, a 1,1,2-trimethylpropyl group, a 1 ethyl-1-methylpropyl group, a 1-methylhexyl group, a 1,2-dimethylpentyl group, a 1,3-dimethylpentyl group, a 1,4-dimethylpentyl group, a 1,2,3-trimethylbutyl group, a 1,2,2-trimethylbutyl group, a 1,3,3-trimethylbutyl group, a 2-methylhexyl group, a 2,3-dimethylpentyl group, a 2,4-dimethylpentyl group, a 2,3,3-trimethylbutyl group, a 1,1-dimethylpentyl group, a 1,1,2-trimethylbutyl group, a 1,1,3-trimethylbutyl group, a 1,1,2,2-tetramethylpropyl group, a 2,2-dimethylpentyl group, a 2,2,3-trimethylbutyl group, a 3-methylhexyl group, a 3,4-dimethylpentyl group, a 3,3-dimethylpentyl group, a 1-ethylpentyl group, a 1-ethyl-2-methylbutyl group, a 1-ethyl-3-methylbutyl group, a 1-ethyl-2,2-dimethylpropyl group, a 2-ethylpentyl group, a 2-ethyl-3-methylbutyl group, a 1-ethyl-1-methylbutyl group, a 1-ethyl-1,2-dimethylpropyl group, a 3-ethylpentyl group, a 1,1-diethylpropyl group, a 2,2-diethylpropyl group, a 1 propylbutyl group, a diisopropylmethyl group, and a 1-isopropylbutyl group.

In formula (2), m is an integer of 2 or more, and is preferably an integer of 2 to 6, more preferably an integer of 2 to 4, and particularly preferably 2, from the viewpoint of, for example, the solubility of the carbodimide monomer, the availability thereof, and the ease of purification of the resulting graft-modified product.

<Base Polymer>

The base polymer before graft-modified with the carbodiimide monomer is at least one polymer selected from polyolefins.

Specific examples of the olefin include ethylene, propylene, 1-butene, 1-pentene, 1-hexene, 1-octene, 1-decene, and 4-methyl-1-pentene.

The polyolefin may be a homopolymer of any of these olefins, a copolymer of two or more of these olefins, or a copolymer of one or more of these olefins and one or more of the following monomers. Among these, the polyolefin is preferably at least one polymer selected from an ethylene polymer, a propylene polymer, and a butene polymer. The polyolefin is more preferably at least one polymer selected from an ethylene polymer and a propylene polymer from the viewpoint of, for example, excellent separability from impurities after the graft reaction, and, in the case of using a solvent in the graft reaction, excellent solubility in the solvent.

Two or more of the base polymers may be used, but usually one is used.

The base polymer is preferably a polymer being free of at least one active hydrogen-containing group selected from a carboxy group, an acid anhydride group, an amino group, a hydroxy group, and a thiol group, from the viewpoint of, for example, further exhibiting the effects of the present invention.

Further, the base polymer is also preferably a polymer being free of a group that is easily converted into a group having active hydrogen by, for example, water, such as a carboxylic acid derivative group such as acid halide, amide, imide, or ester, or an epoxy group, from the viewpoint of, for example, further exhibiting the effects of the present invention.

The weight average molecular weight (Mw) of the base polymer is not particularly limited, but is preferably 100,000 or more, more preferably 150,000 or more, and preferably 1,000,000 or less, more preferably 700,000 or less, from the viewpoint of, for example, the ease of synthesis of the present modified product.

The number-average molecular weight (Mn) of the base polymer is also not particularly limited, but is preferably 40,000 or more, more preferably 50,000 or more, and preferably 500,000 or less, more preferably 300,000 or less, from the same reason.

The molecular weight distribution (Mw/Mn) of the base polymer is also not particularly limited, but is preferably 1.5 or more, more preferably 2.0 or more, and is preferably 6.0 or less, more preferably 5.0 or less.

The Mw and Mn are values measured under the following conditions using HLC-8321 GPC/HT type gel permeation chromatograph (GPC) manufactured by Tosoh Corporation.

Separation column: TSKgel $GMH_6$-HT (two columns) and TSKgel $GMH_6$-HTL (two columns) (both 7.5 mm I.D.×30 cm, manufactured by Tosoh Corporation)
Column temperature: 140° C.
Mobile phase: o-dichlorobenzene (containing 0.025% dibutylhydroxytoluene (BHT))
Developing rate: 1.0 mL/min
Sample concentration: 0.1% (w/v)
Sample injection volume: 0.4 mL
Detector: Differential refractometer
Calibration of apparatus: monodispersed polystyrene (manufactured by Tosoh Corporation, #3std set) was used The base polymer can be synthesized by a conventionally known method, or a commercially available product may be used.

The conventionally known method is not particularly limited, and examples thereof include a method using a coordination polymerization catalyst system containing a transition metal. Specific examples thereof include a method in which ethylene or propylene and, as necessary, a comonomer described below are (co)polymerized in the presence of a catalyst such as a magnesium chloride-supported titanium catalyst, a vanadium catalyst containing a soluble vanadium compound and an alkylaluminum halide compound, or a metallocene catalyst containing a metallocene compound and an organoaluminumoxy compound.

[Ethylene Polymer]

The ethylene polymer is not particularly limited as long as the content of a structural unit derived from ethylene in the polymer is 50% by mass or more, and may be a homopolymer of ethylene or a copolymer of ethylene and a comonomer. In the case of the copolymer, the structure is not particularly limited.

Examples of the comonomer include at least one monomer selected from propylene, an α-olefin having 4 to 20 carbon atoms, and conjugated polyenes, and among these, propylene and an α-olefin having 4 to 20 carbon atoms are preferable.

The α-olefin having 4 to 20 carbon atoms may be linear or branched, and examples thereof include 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene.

The content of the structural unit derived from the comonomer in the ethylene polymer is preferably 50% by mass or less, more preferably 30% by mass or less, and particularly preferably 20% by mass or less, from the viewpoint of, for example, easy handling without blocking of pellets or powder. An ethylene polymer having a propylene-derived or butene-derived structural unit content of 50% by mass is referred to as an ethylene polymer in the present specification.

[Propylene Polymer]

The propylene polymer is not particularly limited as long as the content of a structural unit derived from propylene in the polymer is 50% by mass or more, and may be a homopolymer of propylene or a copolymer of propylene and a comonomer. The structure of these (co)polymers is not particularly limited.

Examples of the comonomer include at least one monomer selected from ethylene, an α-olefin having 4 to 20 carbon atoms, and conjugated polyenes, and among these, ethylene and an α-olefin having 4 to 20 carbon atoms are preferable.

Examples of the α-olefin having 4 to 20 carbon atoms include, for example, the same α-olefins as the α-olefins having 4 to 20 carbon atoms mentioned in the section of the ethylene polymer.

The content of the structural unit derived from the comonomer in the propylene polymer is preferably 50% by mass or less, more preferably 30% by mass or less, and particularly preferably 20% by mass or less, from the viewpoint of, for example, easy handling without blocking of pellets or powder. A propylene polymer having a butene-derived structural unit content of 50% by mass is referred to as a propylene polymer in the present specification.

[Butene Polymer]

The butene polymer is not particularly limited as long as the content of a structural unit derived from butene in the polymer is 50% by mass or more, and may be a homopolymer of butene, particularly 1-butene, or a copolymer of butene (particularly 1-butene) and a comonomer. The structure of these (co)polymers is not particularly limited.

Examples of the comonomer include at least one monomer selected from ethylene, propylene, an α-olefin having 5 to 20 carbon atoms, and conjugated polyenes, and among these, ethylene, propylene, and an α-olefin having 5 to 20 carbon atoms are preferable.

Examples of the α-olefin having 5 to 20 carbon atoms include, for example, the same α-olefins as the α-olefins having 5 to 20 carbon atoms mentioned in the section of the ethylene polymer.

The content of the structural unit derived from the comonomer in the butene polymer is preferably 50% by mass or less, more preferably 30% by mass or less, and particularly preferably 20% by mass or less, from the viewpoint of, for example, easy handling without blocking of pellets or powder.

<Method of Synthesizing Present Modified Product>

There are no particular limitations on the method of synthesizing the present modified product, as long as a graft-modified product obtained by graft-modifying the base polymer with the carbodiimide monomer can be obtained, the method is preferably a method in which a radical initiator and the carbodiimide monomer are added to a solution in which the base polymer is dissolved or dispersed in a solvent, preferably a solution in which the base polymer is dissolved in an organic solvent, to cause a reaction (graft reaction) from the viewpoint of, for example, easily synthesizing the present modified product. When a reaction apparatus having a stirring capability capable of homogeneously fluidizing the base polymer is used, the solvent may not be used.

According to the above method, since graft polymerization occurs, a graft-modified product is obtained.

The amount of the carbodiimide monomer used in the graft reaction is preferably 10 to 1000 mol, and more preferably from 10 to 800 mol, based on 1 mol of the base polymer, from the viewpoint, for example, that the present modified product having a graft ratio within the above range can be easily obtained, and the formation of a polymer of the carbodiimide monomer itself (hereinafter, also referred to as "non-grafted polymer") can be suppressed.

Examples of the radical initiator include organic peroxides and azo compounds, and specific examples thereof include organic peroxides such as benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate, tert-butyl perdiethylacetate, and tert-butylperoxyisopropyl monocarbonate(tert-butylperoxyisopropyl monocarbonate); and azo compounds such as azobisisobutyronitrile and dimethylazoisobutyrate. Among these, organic peroxides such as dicumyl peroxide, di-tert-butyl peroxide, 2,5-dimethyl-2,5-di(tert-butylperoxy)hexyne-3,2,5-dimethyl-2,5-di(tert-butylperoxy) hexane, 1,4-bis(tert-butylperoxyisopropyl)benzene, and tert-butylperoxyisopropyl monocarbonate are preferable.

The radical initiator may be used alone or two or more kinds thereof may be used.

The amount of the radical initiator to be used in the graft reaction is preferably 0.01 mol or more, more preferably 0.05 mol or more, and preferably 0.7 mol or less, more preferably 0.5 mol or less, based on 1 mol of the carbodiimide monomer, from the viewpoint, for example, that the graft reaction efficiently occurs and the present modified product having a graft ratio in the above range can be easily obtained.

The organic solvent is preferably an organic solvent that does not significantly inhibit the graft reaction of the carbodiimide monomer and has affinity for the base polymer in a temperature range in which the graft reaction is performed. Specific examples of such an organic solvent include aromatic hydrocarbon solvents such as benzene, toluene, and xylene; aliphatic hydrocarbon solvents such as pentane, hexane, heptane, octane, nonane, and decane; alicyclic hydrocarbon solvents such as cyclohexane, methylcyclohexane, and decahydronaphthalene; chlorinated hydrocarbon solvents such as chlorobenzene, dichlorobenzene, trichlorobenzene, methylene chloride, chloroform, carbon tetrachloride, and tetrachloroethylene; alcohol solvents such as methanol, ethanol, n-propanol, iso-propanol, n-butanol, sec-butanol, and tert-butanol; ketone solvents such as acetone, methyl ethyl ketone, and methyl isobutyl ketone; ester solvents such as ethyl acetate, and dimethyl phthalate; and ether solvents such as dimethyl ether, diethyl ether, di-n-amyl ether, tetrahydrofuran, and dioxyanisole. Alternatively, suspension polymerization or emulsion polymerization may be carried out using water as a solvent. These solvents may be used alone or two or more kinds thereof may be used. By the use of the solvent(s), the reaction solution preferably becomes a homogeneous phase, but may become a plurality of heterogeneous phases.

In order to perform the graft reaction in a region where the liquid containing the base polymer can be homogeneously stirred, the concentration of the base polymer in the liquid is usually set to 50 to 500 g/L, but is preferably set to 200 to 500 g/L to achieve a high graft ratio.

The radical initiator and the carbodiimide monomer may be added all at once to a liquid containing the base polymer (or the base polymer itself) to initiate the graft reaction, but to achieve a high graft ratio, the graft reaction is preferably performed by sequentially adding the radical initiator and the carbodiimide monomer over a period of about 0.1 to 5 hours.

When the radical initiator and the carbodiimide monomer are added to the base polymer or a solution in which the base polymer is dissolved or dispersed in a solvent, the order of addition is not particularly limited. For example, when the radical initiator and the carbodiimide monomer are added sequentially as described above, the radical initiator and the carbodiimide monomer may be added sequentially, or the radical initiator may be added sequentially after the carbodiimide monomer is added first.

The graft reaction is desirably performed at a temperature of usually 60° C. or higher, preferably 100° C. or higher, and usually 200° C. or lower, preferably 160° C. or lower, for usually 2 hours or more, preferably 3 hours or more, and usually 10 hours or less, preferably 8 hours or less.

The present modified product obtained by the graft reaction may be purified and isolated from the solvent used, the unreacted radical initiator and carbodiimide monomer, and the non-grafted polymer produced as a by-product by using known methods such as filtration, centrifugation, reprecipitation operations and/or washing in combination as necessary.

In this case, it is desirable to perform purification and isolation so that the content of the non-grafted polymer in the present modified product is preferably 5% by mass or less, and more preferably 2% by mass or less, from the viewpoint of, for example, easily obtaining the present modified product having more excellent compatibility and adhesiveness can be easily obtained.

<Applications of the Present Modified Product>

The present modified product has excellent compatibility with polar resins such as polyesters, polyphenylene sulfides, polyamides, polyacetals, polycarbonates, poly(meth)acrylates, modified fluororesins, and biomass plastics, and olefin polymers, and thus can be used as a compatibilizer for compositions containing these polar resins and olefin polymers; the present modified product has excellent adhesiveness to metals, glass, paper, or these polar resins and olefin polymers, and thus can be used as an adhesive for substrates containing these materials; and the present modified product has an excellent dispersibility in olefin polymers, and thus can be mixed with an olefin polymer to be used as an olefin resin composition.

Among these, the present modified product has excellent adhesiveness to polyester and polyphenylene sulfide, and thus it is preferable to use the present modified product as an adhesive or an olefin resin composition for (a layer containing) polyester or polyphenylene sulfide from the viewpoint of, for example, further exhibiting the effects of the present invention.

The olefin polymer is not particularly limited as long as it is a polymer containing an olefin as a main component, and various known olefin polymers can be used. Specific examples thereof include homopolymers or copolymers of α-olefins such as ethylene, propylene, 1-butene, 1-hexene, 4-methyl-1-pentene, and 1-octene (for example: high-pressure low-density polyethylene, linear low-density polyethylene (LLDPE), medium-density polyethylene, high-density polyethylene, polypropylene, poly-1-butene, poly-4-methyl-1-pentene, low-crystalline or amorphous ethylene-propylene random copolymers, ethylene-1-butene random copolymers, and propylene-1-butene random copolymers), ethylene-vinyl acetate copolymers (EVA) or saponified products thereof, ethylene-(meth)acrylic acid copolymers or metal salts (ionomers) thereof, ethylene-cyclic olefin copolymers, and polymers obtained by graft-modifying these (co)polymers with a polar compound such as maleic acid or a silane compound.

When the present modified product is used in various applications, various additives may be added to the present modified product as required within a range not impairing the object of the present invention.

Examples of the additive include a softener, a stabilizer, a filler, an antioxidant, a crystal nucleating agent, a wax, a thickener, a mechanical stability-imparting agent, a leveling agent, a wetting agent, a film-forming aid, a crosslinking agent, a preservative, a rust inhibitor, a pigment, a dispersant, an antifreezing agent, an antifoaming agent, a tackifier, another thermoplastic polymer, water, and an organic solvent, and each of these may be used alone or two or more.

<<Olefin Resin Composition>>

An olefin resin composition according to one embodiment of the present invention is not particularly limited as long as it contains the present modified product and one or more olefin polymers, and the present modified product contained in the olefin resin composition may be one kind or two or more kinds.

In addition, the olefin resin composition may include one kind or two or more kinds of the additives described above.

The olefin resin composition can be used not only as an adhesive (adhesive resin composition) but also as, for example, a printing ink, a coating material, a mechanical detergent for polymer processing, and a binder.

The content of the present modified product in the olefin resin composition is not particularly limited, but is usually 0.5% by mass or more, preferably 1% by mass or more, and usually 40% by mass or less, preferably 25% by mass or less, from the viewpoint of, for example, controllability of molding processability and adhesive ability, and economic efficiency.

Examples of the olefin polymer contained in the olefin resin composition include, for example, the same polymers as the olefin polymers described in the section of the applications of the present modified product.

The content of the olefin polymer in the olefin resin composition is not particularly limited, but is usually 60% by mass or more, preferably 75% by mass or more, and usually 99.5% by mass or less, preferably 99% by mass or less, from the viewpoint of, for example, controllability of molding processability and adhesive ability, and economic efficiency.

<<Adhesive>>

An adhesive (including a pressure-sensitive adhesive) according to one embodiment of the present invention is not particularly limited as long as it contains the present modified product or the olefin resin composition, and the present modified product and the olefin resin composition contained in the adhesive may each be one kind or two or more kinds.

The adhesive may be an adhesive composed only of the present modified product, or may contain one kind or two or more kinds of each of the olefin polymers and/or additives described above.

The content of the present modified product in the adhesive containing the present modified product is not particularly limited, but is usually 5 to 100% by mass, and preferably 10 to 100% by mass.

The adhesive can be used in various known forms, for example, as an aqueous dispersion type adhesive, an organic solvent type adhesive, and a hot melt type adhesive.

Examples of the object to be adhered with the adhesive include a layer containing or consisting of: metal; glass; wood; paper; cloth; a thermoplastic resin such as polyester, polyphenylene sulfide, polyamide, polyacetal, polycarbonate, poly(meth)acrylate, an olefin polymer, polystyrene, rubber, a modified fluororesin, a biomass plastic, or an engineering plastic other than these; or a thermosetting resin.

<<Laminate>>

A laminate according to one embodiment of the present invention is not particularly limited as long as it includes a layer (A) containing the present modified product or the olefin resin composition and a base material layer (B), and may include two or more layers of the layer (A) and may include two or more layers of the base material layer (B). When two or more layers of the layer (A) are included, these layers may be the same layer or may be different layers. Similarly, when two or more layers of the base material layer (B) are included, these layers may be the same layer or may be different layers.

The laminate is preferably a laminate containing a layer (A) and a base material layer (B), or a laminate containing a base material layer (B), a layer (A), and a base material layer (B) in this order.

The layer (A) can be obtained using the present modified product, the adhesive, or the olefin resin composition. The presence of the present modified product in the layer (A) can be determined by infrared spectroscopic analysis.

The thickness of the layer (A) is not particularly limited and may be appropriately selected depending on the application of the laminate, but is preferably 2 to 1000 μm.

The thickness of the base material layer (B) is also not particularly limited and may be appropriately selected depending on the application of the laminate, but is preferably 2 to 1000 μm.

Examples of the base material layer (B) include a layer containing or consisting of: metal; glass; wood; paper; cloth; a thermoplastic resin such as polyester, polyphenylene sulfide, polyamide, polyacetal, polycarbonate, poly(meth)acrylate, an olefin polymer, polystyrene, rubber, a modified fluororesin, a biomass plastic, or an engineering plastic other than these; or a thermosetting resin.

Examples of the thermoplastic resin include various known thermoplastic resins, for example, olefin polymers (for example, the same polymers as those mentioned in the section of the application of the present modified product), polyesters (for example, polyethylene terephthalate, polybutylene terephthalate, polyethylene naphthalate), polyphenylene sulfide, polyamides (for example, nylon-6, nylon-66, polymetaxyleneadipamide), polyvinyl chloride, polyvinylidene chloride, polymethyl methacrylate, polyvinyl acetate, thermoplastic polyimide, polyvinyl alcohol, polyacrylonitrile, polyacetal, polycarbonate, polystyrene, thermoplastic polyurethane, biodegradable plastics (for example, aliphatic polyesters such as polylactic acid), modified fluororesins, and biomass plastics (for example, starch resins).

Examples of the thermosetting resin include various known thermosetting resins such as an epoxy resin, an unsaturated polyester resin, a phenol resin, a urea-melamine resin, a polyurethane resin, a silicone resin, and a polyimide.

The base material layer (B) is preferably a layer having a polar group.

When such a base material layer (B) is used, the carbodiimide group in the present modified product reacts with the polar group in the base material layer (B) to be in a bonded state, and therefore, the adhesiveness between the layer (A) and the base material layer (B) is further improved. In this case, the layer (A) includes not only the present modified product but also a portion in a state where the carbodiimide group of the present modified product has reacted with the polar group of the base material layer (B).

Examples of the polar group include a carboxy group, a hydroxy group, an amino group, an ester group, and a carbonyl group. Among these, a carboxy group and a hydroxy group are preferable. The base material layer (B) may have two or more kinds of polar groups.

For example, the polyester usually has a carboxy group or a hydroxy group at the terminal. Further, the polyphenylene sulfide usually has a carboxy group at a terminal. Glass and metal also usually have hydroxy groups.

The layer containing a thermoplastic resin or a thermosetting resin or the layer consisting thereof may contain, as necessary, additives such as a phenol antioxidant, a phosphorus antioxidant, a sulfur antioxidant, a metal compound, and a metal salt of a higher fatty acid, which are usually added to a resin, within a range not impairing the object of the present invention.

The laminate is not limited to a laminate film (sheet), and may have any of various known shapes such as a hollow container, a cup, and a tray.

The method for producing the laminate varies depending on, for example, the shape, size, and required physical properties of the final product, and is not particularly limited, and examples thereof include the following methods.

(1) A method of heat-sealing using, for example, a calender roll molding machine or a compression molding machine at a temperature equal to or higher than a temperature at which at least one of the previously molded layer (A) and the base material layer (B) is melted.

(2) A method of heat-sealing the previously molded layer (A) or the base material layer (B) to another layer forming by extrusion molding or calender molding.

(3) A method of, in the case of using a layer containing a thermoplastic resin as the base material layer (B), extruding the layer (A) and the base material layer (B) simultaneously for heat-sealing (co-extrusion molding) using a multilayer extruder.

(4) A method of, in the case of using a layer containing a thermoplastic resin as the base material layer (B), injecting a molten material for forming the layer (A) and a molten material for forming the base material layer (B) into a mold at different injection timings (for example, two layers injection molding or sandwich injection molding).

Since the laminate has the layer (A) containing the present modified product or the olefin resin composition, it is possible to obtain a laminate which is excellent in interlayer adhesion and in which the interlayer adhesion is less likely to decrease even when the laminate is heat-treated at a high temperature of, for example, 200 to 250° C.

Further, since the laminate has the layer (A) containing the present modified product or the olefin resin composition, the laminate is excellent in interlayer adhesion, and, for example, in the case of heat-sealing at 230° C., a layer having high adhesion strength can be formed even when the heat-sealing time is as short as preferably 20 seconds or less, more preferably 10 seconds or less, still more preferably 5 seconds or less.

EXAMPLES

An embodiment of the present invention will be described below with reference to Examples, but the present invention is not limited to these Examples.

<Method for Measuring Graft Ratio>

The graft ratio was determined by measuring $^{1}$H-NMR spectrum using Nuclear Magnetic Resonance Spectrometer AVANCE IIIcryo-500 (500 MHz) made by Bruker Biospin under conditions of measurement solvent: 1,1,2,2-tetrachloroethane-d2, measurement temperature: 120° C., spectrum width: 20 ppm, pulse repetition time: 7.0 seconds, and pulse width: 5.00 μsec (45° pulse). In the obtained spectrum, the graft ratio was calculated from the peak intensity ratio between protons of hydrocarbon groups bonded to carbodimide groups present in 3.0 ppm to 4.0 ppm and protons bonded to all hydrocarbon groups derived from the raw polymer present in 0.3 ppm to 2.5 ppm.

Example 1

Into a 1 L autoclave, 25.0 g of LLDPE (base polymer, comonomer species: 1-hexene, comonomer amount: 1.6% by mass, Mw: 164,000, Mn: 63,000, Mw/Mn: 2.60) and 150 mL of toluene were charged, and the autoclave was sealed after nitrogen substitution. Thereafter, the internal temperature of the autoclave was raised to 140° C., and while maintaining the temperature, 28.1 mmol of vinylphenylcyclohexylcarbodiimide and 2.2 mmol of dicumyl peroxide were fed over 2 hours while stirring at a stirring rate of 400 rpm using a double anchor blade. Thereafter, the mixture was further stirred for 2 hours, and then 250 mL of toluene was fed over 15 minutes to dilute the reaction solution.

Thereafter, the internal temperature of the autoclave was cooled to 50° C., and then a slurry-like reaction solution was taken out after depressurization. To the obtained reaction solution, 400 mL of acetone was added, and after stirring for 10 minutes, the stirred solution was filtered and separated into solids and filtrate. The process from the addition of acetone to the filtration was further repeated twice on the obtained solids.

The solids after the third filtration were dried in a vacuum dryer at 70° C. for 10 hours to obtain a graft polymer (P-1). The yield of the graft polymer (P-1) was 25.71 g (mass increase: 0.71 g). The graft ratio was 2.7% by mass.

Example 2

Into a 500 mL glass vessel, 25.0 g of PP (base polymer, propylene homopolymer, Mw: 313,000, Mn: 70,800, Mw/Mn: 4.43) and 110 mL of xylene were charged, and the inside of the vessel was substituted with nitrogen gas. Thereafter, the internal temperature of the vessel was raised to 120° C., and while maintaining the temperature, 28.1 mmol of vinylphenylcyclohexylcarbodiimide and 2.2 mmol of tert-butylperoxyisopropyl monocarbonate (perbutyl I, manufactured by NOF Corporation) dissolved in 10 mL of xylene were fed over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the vessel was cooled to 50° C., and then a slurry-like reaction solution was taken out after depressurization. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 25.13 g of a graft polymer (P-2). The graft ratio was 1.5% by mass.

Example 3

Into a 500 mL glass vessel, 25.0 g of LLDPE (the same polymer as the base polymer used in Example 1) and 110 mL of xylene were charged, and the inside of the vessel was substituted with nitrogen gas. Thereafter, the internal temperature of the vessel was raised to 120° C., and while maintaining the temperature, 14 mmol of vinylphenylphenylcarbodiimide was charged, and then 1.1 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 25.62 g of a graft polymer (P-3). The graft ratio was 3.4% by mass.

Example 4

Into a 500 mL glass vessel, 12.5 g of 4-methylpentene homopolymer (base polymer, Mw: 671,000, Mn: 297,000, Mw/Mn: 2.26) and 50 mL of xylene were charged, and the inside of the vessel was substituted with nitrogen gas. Thereafter, the internal temperature of the vessel was raised to 120° C., and while maintaining the temperature, 14 mmol of vinylphenylcyclohexylcarbodiimide was charged, and then 1.1 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 150 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the filtrate. The process from the addition of acetone to the filtration was further repeated three times on the obtained solids.

The solids after the fourth filtration were dried in a vacuum dryer at 90° C. for 10 hours to obtain 12.71 g of a graft polymer (P-4). The graft ratio was 1.4% by mass.

Example 5

Into a 500 mL glass vessel, 25.0 g of EBR (base polymer, DF710, manufactured by Mitsui Chemicals, Inc.) and 110 mL of xylene were charged, and the inside of the vessel was substituted with nitrogen gas. Thereafter, the internal temperature of the vessel was raised to 120° C., and while maintaining the temperature, 14 mmol of vinylphenylcyclohexylcarbodiimide was charged, and then 1.1 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, stirring was further conducted for 3 hours.

Thereafter, to the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 26.08 g of a graft polymer (P-5). The graft ratio was 3.3% by mass.

Example 6

Into a 500 mL glass vessel, 25.0 g of LLDPE (the same polymer as the base polymer used in Example 1) and 110 mL of xylene were charged, and the inside of the vessel was substituted with nitrogen gas. Thereafter, the internal temperature of the vessel was raised to 120° C., and while maintaining the temperature, 33.4 mmol of ethylphenylcarbodiimide methacrylate was charged, and then 2.2 mmol of tert-butylperoxyisopropyl monocarbonate (perbutyl I, manufactured by NOF Corporation) dissolved in 10 mL of xylene was added dropwise over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 25.87 g of a graft polymer (P-6). The graft ratio was 2.4% by mass.

Example 7

Into a 500 mL glass vessel, 17.0 g of LLDPE (the same polymer as the base polymer used in Example 1) and 78 mL of xylene were charged, and the inside of the vessel was substituted with nitrogen gas. Thereafter, the internal temperature of the vessel was raised to 120° C., and while maintaining the temperature, 24.5 mmol of ethylcyclohexylcarbodiimide methacrylate was charged, and then 1.68 mmol of tert-butylperoxyisopropyl monocarbonate (perbutyl I, manufactured by NOF Corporation) dissolved in 10 mL of xylene was added dropwise over 10 minutes while stirring at a stirring rate of 400 rpm using a double anchor blade. Thereafter, the mixture was further stirred for 3 hours, and then 150 mL of xylene was charged to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 17.49 g of a graft polymer (P-7). The graft ratio was 3.0% by mass.

Example 8

Into a 500 mL glass vessel, 25.0 g of LLDPE (the same polymer as the base polymer used in Example 1) and 110 mL of xylene were charged, and the inside of the vessel was substituted with nitrogen gas. Thereafter, the internal temperature of the vessel was raised to 120° C., and while maintaining the temperature, 35.0 mmol of ethyl methacrylate-tert-butylcarbodiimide was charged, and then 2.2 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 25.49 g of a graft polymer (P-8). The graft ratio was 1.7% by mass.

Example 9

Into a 500 mL glass vessel, 17.1 g of LLDPE (the same polymer as the base polymer used in Example 1) and 73 mL of xylene were charged, and the inside of the vessel was substituted with nitrogen gas. Thereafter, the internal temperature of the vessel was raised to 120° C., and while maintaining the temperature, 23.8 mmol of ethyl methacrylate-n-butylcarbodiimide was charged, and then 1.6 mmol of tert-butylperoxyisopropyl monocarbonate (perbutyl I, manufactured by NOF Corporation) dissolved in 10 mL of xylene was fed over minutes while stirring at a stirring rate of 400 rpm using a double anchor blade. Thereafter, the mixture was further stirred for 3 hours, and then 150 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 17.38 g of a graft polymer (P-9). The graft ratio was 1.6% by mass.

Example 10

Into a 500 mL glass vessel, 14.0 g of LLDPE (the same polymer as the base polymer used in Example 1) and 57 mL of xylene were charged, and the inside of the vessel was substituted with nitrogen gas. Thereafter, the internal temperature of the vessel was raised to 120° C., and while maintaining the temperature, 19.0 mmol of ethyl methacrylate-p-chlorophenylcarbodiimide was charged, and then 1.3 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 150 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 14.43 g of a graft polymer (P-10). The graft ratio was 2.8% by mass.

Example 11

Into a 500 mL glass vessel, 17.0 g of LLDPE (the same polymer as the base polymer used in Example 1) and 73 mL of xylene were charged, and the inside of the vessel was substituted with nitrogen gas. Thereafter, the internal temperature of the vessel was raised to 120° C., and while maintaining the temperature, 22.5 mmol of ethyl methacrylate-p-methoxyphenylcarbodiimide was charged, and then 1.5 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 150 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the filtrate. The process from the addition of acetone to the filtration was further repeated three times on the obtained solids.

The solids after the fourth filtration were dried in a vacuum dryer at 90° C. for 10 hours to obtain 17.37 g of a graft polymer (P-11). The graft ratio was 1.6% by mass.

Example 12

Into a 500 mL glass vessel, 20.0 g of PP (the same polymer as the base polymer used in Example 2) and 86 mL of xylene were charged, and the inside of the vessel was substituted with nitrogen gas. Thereafter, the internal temperature of the vessel was raised to 120° C., and while maintaining the temperature, 22.6 mmol of ethylphenylcarbodiimide methacrylate was charged, and then 9.2 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 19.89 g of a graft polymer (P-12). The graft ratio was 1.5% by mass.

Example 13

Into a 500 mL glass vessel, 19.0 g of PP (the same polymer as the base polymer used in Example 2) and 81 mL of xylene were charged, and the inside of the vessel was substituted with nitrogen gas. Thereafter, the internal temperature of the vessel was raised to 120° C., and while maintaining the temperature, 20 mmol of ethylcyclohexylcarbodiimide methacrylate was charged, and then 9.2 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 18.89 g of a graft polymer (P-13). The graft ratio was 1.4% by mass.

Example 14

Into a 500 mL glass vessel, 15.0 g of PP (the same polymer as the base polymer used in Example 2) and 62 mL of xylene were charged, and the inside of the vessel was substituted with nitrogen gas. Thereafter, the internal temperature of the vessel was raised to 120° C., and while maintaining the temperature, 22.1 mmol of ethyl methacrylate-tert-butylcarbodiimide was charged, and then 9.2 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 150 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 15.37 g of a graft polymer (P-14). The graft ratio was 1.3% by mass.

Example 15

Into a 500 mL glass vessel, 15.0 g of PP (the same polymer as the base polymer used in Example 2) and 62 mL of xylene were charged, and the inside of the vessel was substituted with nitrogen gas. Thereafter, the internal temperature of the vessel was raised to 120° C., and while maintaining the temperature, 17.8 mmol of ethyl methacrylate-p-chlorophenylcarbodiimide was charged, and then 6.9 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 150 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 14.60 g of a graft polymer (P-15). The graft ratio was 1.6% by mass.

Example 16

Into a 500 mL glass vessel, 20.0 g of PP (the same polymer as the base polymer used in Example 2) and 86 mL of xylene were charged, and the inside of the vessel was substituted with nitrogen gas. Thereafter, the internal temperature of the vessel was raised to 120° C., and while maintaining the temperature, 22.5 mmol of ethyl methacrylate-p-methoxyphenylcarbodiimide was charged, and then 9.2 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the vessel was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 20.30 g of a graft polymer (P-16). The graft ratio was 1.6% by mass.

Example 17

Into a 500 mL glass vessel, 10.0 g of EBR (the same polymer as the base polymer used in Example 5) and 38 mL of xylene were charged, and the inside of the vessel was substituted with nitrogen gas. Thereafter, the internal temperature of the vessel was raised to 120° C., and while maintaining the temperature, 13.4 mmol of ethyl methacrylate-tert-butylcarbodiimide was charged, and then 0.9 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, stirring was further conducted for 3 hours.

Thereafter, to the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 18.91 g of a graft polymer (P-17). The graft ratio was 4.1% by mass.

Example 18

Into a 500 mL separable flask, 23 g of LLDPE (the same polymer as the base polymer used in Example 1) and 100 mL of xylene were charged, and the inside of the separable flask was substituted with nitrogen gas. Thereafter, the internal temperature of the flask was raised to 120° C., and while maintaining the temperature, 30 mmol of ethylisopropylcarbodiimide methacrylate was charged, and then 2.0 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 200 mL of xylene was fed to dilute the reaction solution.

Thereafter, the internal temperature of the separable flask was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 23.54 g of a graft polymer (P-18). The graft ratio was 1.7% by mass.

Example 19

Into a 500 mL separable flask, 13.2 g of PP (the same polymer as the base polymer used in Example 2) and 54 mL of xylene were charged, and the inside of the separable flask was substituted with nitrogen gas. Thereafter, the internal temperature of the flask was raised to 120° C., and while maintaining the temperature, 19.5 mmol of ethylisopropylcarbodiimide methacrylate was charged, and then 8.0 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, the mixture was further stirred for 3 hours, and then 150 mL of xylene was fed to dilute the reaction solution.

Thereafter, the internal temperature of the separable flask was cooled to 50° C., and then a slurry-like reaction solution was taken out. To the obtained reaction solution, 400 mL of acetone was added, and after stirring for 10 minutes, the stirred solution was filtered and separated into solids and filtrate. The process from the addition of acetone to the filtration was further repeated three times on the obtained solids.

The solids after the fourth filtration were dried in a vacuum dryer at 90° C. for 10 hours to obtain 13.29 g of a graft polymer (P-19). The graft ratio was 1.7% by mass.

Comparative Example 1

Into a 500 mL glass vessel, 25.0 g of LLDPE (the same polymer as the base polymer used in Example 1) and 110 mL of xylene were charged, and the inside of the vessel was substituted with nitrogen gas. Thereafter, the internal temperature of the vessel was raised to 120° C., and 33.4 mmol of glycidyl methacrylate was charged into the vessel, and then 2.21 mmol of tert-butylperoxyisopropyl monocarbonate (perbutyl I, manufactured by NOF Corporation) dissolved in 10 mL of xylene was fed over 10 minutes while stirring at a stirring rate of 400 rpm using a double anchor blade. Thereafter, stirring was further conducted for 3 hours.

Thereafter, 250 mL of xylene was added, the temperature was again raised to 120° C., and then the internal temperature of the vessel was gradually cooled to 50° C. The reaction solution was taken out, and 400 mL of acetone was added to the obtained reaction solution, and the mixture was stirred for 10 minutes. Thereafter, the reaction solution was filtered and separated into solids and filtrate. The obtained solids were washed three times with 400 mL of acetone, and the solids after the fourth filtration was dried in a vacuum dryer at 70° C. for 10 hours to obtain a graft polymer (CP-1).

The yield of the obtained graft polymer (CP-1) was 25.95 g. The graft ratio was 2.4% by mass.

Comparative Example 2

Into a 500 mL glass vessel, 25.0 g of PP (the same polymer as the base polymer used in Example 2) and 120 mL of xylene were charged, and the inside of the vessel was substituted with nitrogen gas. Thereafter, the internal temperature of the vessel was raised to 120° C., and while maintaining the temperature, 33.4 mmol of glycidyl methacrylate was charged, and then 11 mmol of tert-butylperoxyisopropyl monocarbonate (perbutyl I, manufactured by NOF Corporation) dissolved in 10 mL of xylene was added dropwise over 10 minutes while stirring at a stirring rate of 400 rpm using a double anchor blade. Thereafter, stirring was further conducted for 3 hours.

Thereafter, 200 mL of xylene was added, and then the internal temperature of the vessel was gradually cooled to 50° C. The slurry-like reaction solution was taken out, and 400 mL of acetone was added to the obtained reaction solution, and the mixture was stirred for 10 minutes. Thereafter, the reaction solution was filtered and separated into solids and filtrate. The obtained solids were washed three times with 400 mL of acetone to remove unreacted glycidyl methacrylate and the homopolymer of glycidyl methacrylate.

The obtained solids were dried in a vacuum dryer at 90° C. for 10 hours to obtain 25.26 g of a graft polymer (CP-2). The graft ratio was 1.0% by mass.

Example 20

Using a Labo Plastomill, 11 parts by mass of the graft polymer (P-1) produced in Example 1 and 89 parts by mass of LLDPE (the same polymer as the base polymer used in Example 1) were kneaded at a temperature of 190° C., a screw rotational speed of 60 rpm, and a kneading time of 10 minutes, press-molded at a temperature of 180° C., a pressure of 4 MPa, a preheating time of 5 minutes, and a pressing time of 3 minutes, and then quenched in a press-molding machine set at to obtain an olefin resin composition C-1 (a press sheet having a thickness of 500 μm, a length of 80 mm, and a width of 80 mm).

The obtained olefin resin composition C-1 had an MFR (190° C., 2.16 kg load) of 2.7 g/10 min and a density of 0.903 g/cm$^3$.

Example 21

An olefin resin composition C-2 was obtained in the same manner as in Example 20, except that 12 parts by mass of the graft polymer (P-2) produced in Example 2 and 88 parts by mass of PP (the same polymer as the base polymer used in Example 2) were used.

The obtained olefin resin composition C-2 had an MFR (190° C., 2.16 kg load) of 0.6 g/10 min and a density of 0.893 g/cm$^3$.

Example 22

An olefin resin composition C-3 was obtained in the same manner as in Example 20, except that 12 parts by mass of the graft polymer (P-6) produced in Example 6 and 88 parts by mass of LLDPE (the same polymer as the base polymer used in Example 1) were used.

The obtained olefin resin composition C-3 had an MFR (190° C., 2.16 kg load) of 2.93 g/10 min and a density of 0.903 g/cm$^3$.

Example 23

An olefin resin composition C-4 was obtained in the same manner as in Example 20, except that 10 parts by mass of the graft polymer (P-7) produced in Example 7 and 90 parts by mass of LLDPE (the same polymer as the base polymer used in Example 1) were used.

The obtained olefin resin composition C-4 had an MFR (190° C., 2.16 kg load) of 3.1 g/10 min and a density of 0.902 g/cm$^3$.

Example 24

An olefin resin composition C-5 was obtained in the same manner as in Example 20, except that 16 parts by mass of the graft polymer (P-8) produced in Example 8 and 84 parts by mass of LLDPE (the same polymer as the base polymer used in Example 1) were used.

The obtained olefin resin composition C-5 had an MFR (190° C., 2.16 kg load) of 3.5 g/10 min and a density of 0.902 g/$cm^3$.

Example 25

An olefin resin composition C-6 was obtained in the same manner as in Example 20, except that 17 parts by mass of the graft polymer (P-9) produced in Example 9 and 83 parts by mass of LLDPE (the same polymer as the base polymer used in Example 1) were used.

The obtained olefin resin composition C-6 had an MFR (190° C., 2.16 kg load) of 2.73 g/10 min.

Example 26

An olefin resin composition C-7 was obtained in the same manner as in Example 20, except that 12 parts by mass of the graft polymer (P-10) produced in Example 10 and 88 parts by mass of LLDPE (the same polymer as the base polymer used in Example 1) were used.

Example 27

An olefin resin composition C-8 was obtained in the same manner as in Example 20, except that 21 parts by mass of the graft polymer (P-11) produced in Example 11 and 79 parts by mass of LLDPE (the same polymer as the base polymer used in Example 1) were used.

Example 28

An olefin resin composition C-9 was obtained in the same manner as in Example 20, except that 12 parts by mass of the graft polymer (P-12) produced in Example 12 and 88 parts by mass of PP (the same polymer as the base polymer used in Example 2) were used.

The obtained C-9 had an MFR (190° C., 2.16 kg load) of 1.0 g/10 min.

Example 29

An olefin resin composition C-10 was obtained in the same manner as in Example 20, except that 14 parts by mass of the graft polymer (P-13) produced in Example 13 and 86 parts by mass of PP (the same polymer as the base polymer used in Example 2) were used.

The obtained olefin resin composition C-10 had an MFR (190° C., 2.16 kg load) of 1.8 g/10 min.

Example 30

An olefin resin composition C-11 was obtained in the same manner as in Example 20, except that 13 parts by mass of the graft polymer (P-14) produced in Example 14 and 87 parts by mass of PP (the same polymer as the base polymer used in Example 2) were used.

The obtained olefin resin composition C-11 had an MFR (190° C., 2.16 kg load) of 2.0 g/10 min and a density of 0.892 g/$cm^3$.

Example 31

An olefin resin composition C-12 was obtained in the same manner as in Example 20, except that 13 parts by mass of the graft polymer (P-15) produced in Example 15 and 87 parts by mass of PP (the same polymer as the base polymer used in Example 2) were used.

Example 32

An olefin resin composition C-13 was obtained in the same manner as in Example 20, except that 13 parts by mass of the graft polymer (P-16) produced in Example 16 and 87 parts by mass of PP (the same polymer as the base polymer used in Example 2) were used.

Comparative Example 3

An olefin resin composition CC-1 was obtained in the same manner as in Example 20, except that 10 parts by mass of the graft polymer (CP-1) produced in Comparative Example 1 and 90 parts by mass of LLDPE (the same polymer as the base polymer used in Example 1) were used.

The obtained olefin resin composition CC-1 had an MFR (190° C., 2.16 kg load) of 3.2 g/10 min and a density of 0.902 g/$cm^3$.

Comparative Example 4

An olefin resin composition CC-2 was obtained in the same manner as in Example 20, except that 12 parts by mass of the graft polymer (CP-2) produced in Comparative Example 2 and 88 parts by mass of PP (the same polymer as the base polymer used in Example 2) were used.

The obtained olefin resin composition CC-2 had an MFR (190° C., 2.16 kg load) of 1.9 g/10 min and a density of 0.892 g/$cm^3$.

<Adhesion Evaluation>

Production of Press Sheet

Each of the graft polymers obtained in Examples 1 and 3 and Comparative Example 1 was press-molded at a temperature of 180° C., a pressure of 4 MPa, a preheating time of 5 minutes, and a pressing time of 3 minutes, and then quenched in a press-molding machine set at 20° C. to produce a press sheet having a thickness of 500 μm, a length of 80 mm, and a width of 80 mm.

Production of Laminate

A polyethyleneterephthalate (PET) sheet having a thickness of 50 μm, a length of 80 mm, and a width of 80 mm (product name: Lumirror T60, manufactured by Toray Industries, Inc.) was used as the base material layer.

The PET sheet, the press sheet, and the PET sheet were laminated in this order, the laminated sheets were sandwiched between Teflon (R) sheets, and heat sealing was performed for seconds, 10 seconds, or 30 seconds using a heat sealer in which the temperature of the (lower) press plate was set to 230° C. and the temperature of the (upper) press plate was set to 230° C. or 250° C. to produce a three-layered laminate.

Peeling Test

For the produced laminate, the upper PET sheet (the PET sheet on the press plate (upper) side) and the press sheet were T-peeled from each other under the conditions of a peeling atmosphere temperature of 23° C., a peeling rate of 300 mm/min, and a peel width of 15 mm, and the peel strength between the PET sheet and the press sheet was measured. Table 1 shows the results. The case where the PET sheet itself breaks off rather than the interface between the PET sheet and the press sheet due to strong adhesive strength is indicated as "PET resin breakage".

TABLE 1

| | Heat-sealing temperature (° C.) | Heat-sealing time (sec) | Peel strength (N/15 mm) |
|---|---|---|---|
| Example 1 | 230 | 5 | PET resin breakage |
| | 230 | 10 | PET resin breakage |
| | 230 | 30 | PET resin breakage |
| | 250 | 5 | PET resin breakage |
| Example 3 | 230 | 5 | 4.2 |
| | 230 | 10 | 5.6 |
| | 250 | 5 | 14.6 |
| Comparative | 230 | 5 | 1.0 |
| Example 1 | 230 | 10 | 3.7 |
| | 230 | 30 | PET resin breakage |
| | 250 | 5 | 4.1 |

<Adhesion Evaluation>

A polyethyleneterephthalate (PET) sheet having a thickness of 50 μm, a length of 80 mm, and a width of 80 mm (product name: Lumirror T60, manufactured by Toray Industries, Inc.) was used as the base material layer.

The PET sheet, the press sheet (the olefin resin composition obtained in Examples 20 to 32 or Comparative Examples 3 and 4) and the PET sheet were laminated in this order, and the laminated sheets were sandwiched between Teflon (R) sheets and heat-sealed for 3 seconds with a heat sealer in which the temperature of upper and lower the press plate was set to 200° C. or 230° C. to produce a three-layered laminate.

Using the produced laminate, a peel test was performed in the same manner as described above. Table 2 shows the results.

TABLE 2

| | Heat-sealing temperature (° C.) | Peel strength (N/15 mm) |
|---|---|---|
| Example 20 | 200 | 4.3 |
| | 230 | PET resin breakage |
| Example 21 | 200 | 3.6 |
| | 230 | PET resin breakage |
| Example 22 | 200 | 4.9 |
| | 230 | 6.4 |
| Example 23 | 200 | 6.4 |
| | 230 | 9.4 |
| Example 24 | 200 | 7.6 |
| | 230 | PET resin breakage |
| Example 25 | 200 | PET resin breakage |
| | 230 | PET resin breakage |
| Example 26 | 200 | 3.7 |
| | 230 | 5.3 |
| Example 27 | 200 | 5.8 |
| | 230 | 6.3 |
| Example 28 | 200 | 0.8 |
| | 230 | 0.6 |
| Example 29 | 200 | 1.2 |
| | 230 | 6.8 |
| Example 30 | 200 | 9.5 |
| | 230 | PET resin breakage |
| Example 31 | 200 | 0.2 |
| | 230 | 0.9 |
| Example 32 | 200 | 0.3 |
| | 230 | 0.6 |
| Comparative | 200 | 0.9 |
| Example 3 | 230 | 2.1 |
| Comparative | 200 | 0.1 |
| Example 4 | 230 | 0.2 |

The invention claimed is:

1. A graft-modified product of at least one base polymer selected from polyolefins by a carbodiimide monomer having a carbodiimide group and a polymerizable double bond, wherein a graft ratio in the graft-modified product is 0.3 to 7% by mass.

2. The graft-modified product according to claim 1, wherein the carbodiimide monomer is a carbodiimide monomer represented by formula (1):

(1)

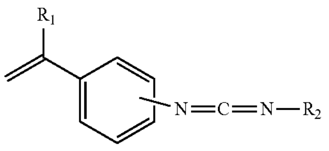

wherein $R_1$ is a hydrogen atom or a methyl group, and $R_2$ is a hydrocarbon group optionally having a substituent.

3. The graft-modified product according to claim 2, wherein $R_2$ is an alicyclic ring-containing aliphatic hydrocarbon group having 4 to 20 carbon atoms.

4. The graft-modified product according to claim 1, wherein the carbodiimide monomer is a carbodiimide monomer represented by formula (2):

(2)

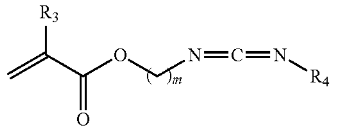

wherein $R_3$ is a hydrogen atom or a methyl group, $R_4$ is a hydrocarbon group optionally having a substituent, and m is an integer of 2 or more.

5. The graft-modified product according to claim 4, wherein $R_3$ is a methyl group, $R_4$ is a branched and ring-free alkyl group, and m is 2.

6. The graft-modified product according to claim 1, wherein the base polymer is a polymer being free of at least one active hydrogen-containing group selected from a carboxy group, an acid anhydride group, an amino group, a hydroxy group, and a thiol group.

7. The graft-modified product according to claim 1, wherein the polyolefin is at least one selected from an ethylene polymer and a propylene polymer.

8. An olefin resin composition comprising the graft-modified product according to claim 1 and one or more olefin polymers.

9. An adhesive comprising the graft-modified product according to claim 1.

10. A laminate comprising:

a layer (A) comprising the graft-modified product according to claim 1; and a base material layer (B).

11. The laminate according to claim 10, wherein the base material layer (B) is a layer having a polar group.

12. The laminate according to claim 11, wherein the polar group is a carboxy group or a hydroxy group.

* * * * *